Patented Dec. 26, 1922.

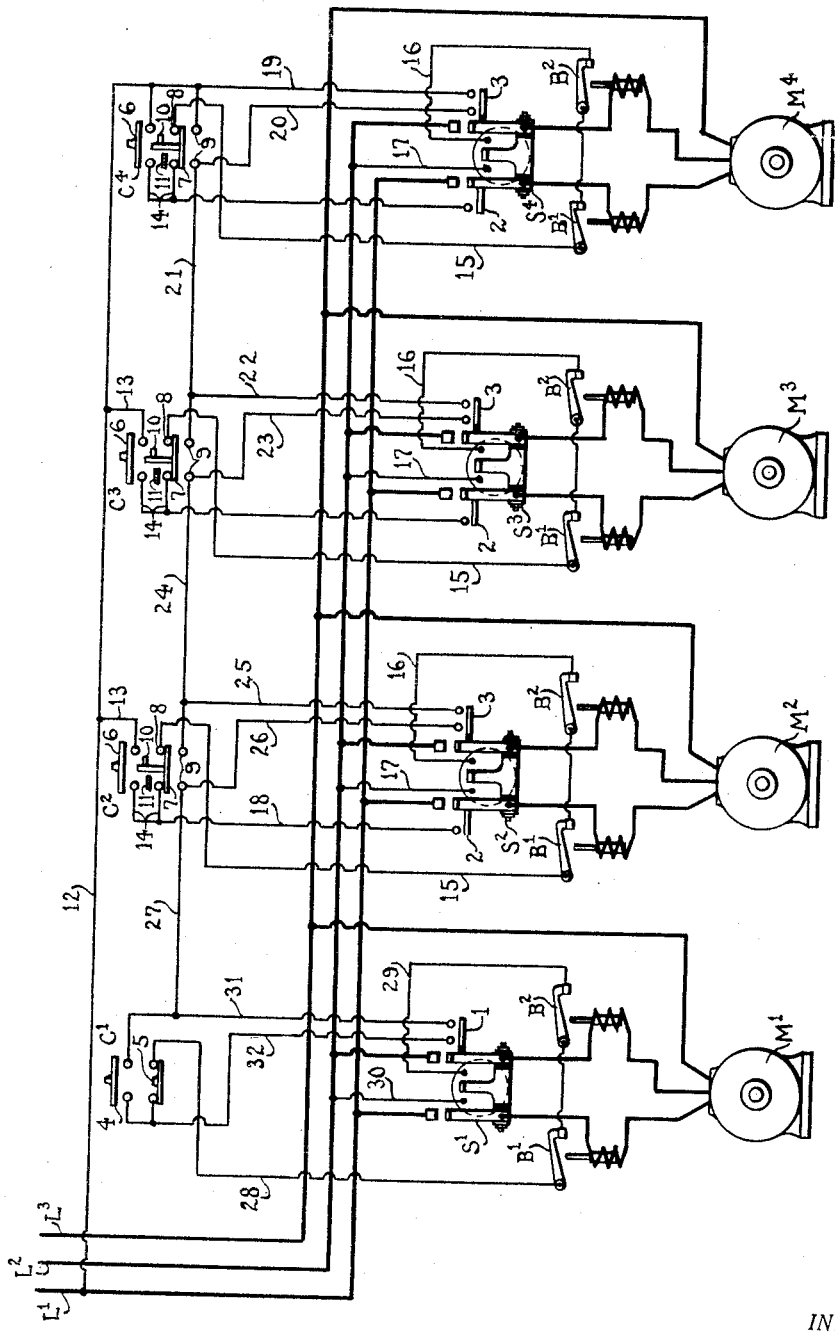

1,439,871

UNITED STATES PATENT OFFICE.

LEONARD P. COULTER, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed February 13, 1922. Serial No. 536,254.

*To all whom it may concern:*

Be it known that I, LEONARD P. COULTER, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers and while not limited thereto is particularly applicable to controllers for machines having a plurality of tool operating motors and a motor operated feeding mechanism.

In such machines it is necessary to provide for starting of the tool operating motors selectively and to also insure against starting of any of such motors while the feed motor is in operation. It is also necessary to provide for stopping of any of the tool operating motors under abnormal current conditions and to insure stopping of the feed motor upon stopping of any of the tool operating motors. Further it is necessary to provide for starting of the feed motor with any or all of the tool operating motors idle.

The present invention has among its objects to provide a controller for machines of the aforesaid character which will meet the aforegoing requirements.

Various other objects and advantages of the invention will hereinafter appear.

The accompanying drawing illustrates a controller embodying the invention and the same will now be described, it being understood that the controller illustrated is adapted for use in connection with various types of machines and is susceptible of modification without departing from the scope of the appended claims.

The controller shown in the drawing is adapted to control a three phase feed motor M' and a plurality of three phase tool operating motors $M^2$, $M^3$ and $M^4$. Said motors are adapted to be started by connecting the same directly across lines L', $L^2$ and $L^3$, and each of the same has one terminal permanently connected to line $L^3$, while the other terminals of each are adapted to be connected to lines L', $L^2$ by a two pole electro-magnetic starting switch S. Starting switch S' has a normally open auxiliary switch 1 associated therewith for a purpose hereinafter set forth, while starting switches $S^2$, $S^3$ and $S^4$ are each provided with normally open auxiliary switches 2 and 3 for a purpose hereinafter set forth. Switch S' is controlled from a push button station C' including a normally open push button switch 4 and a normally closed push button switch 5, while switches $S^2$, $S^3$ and $S^4$ are controlled from push button stations $C^2$, $C^3$ and $C^4$ respectively, each including a normally open push button 6 and a push button 7 normally in engagement with up contacts 8 and depressible to engage down contacts 9. Each of the push buttons 7 has a pin 10 fixed thereto and can be locked in its depressed position by rotating the same to bring said pin into engagement with the under side of a fixed stop 11. Also as hereinafter set forth the energizing circuit of each of the switches S' to $S^4$ inclusive is adapted to be interrupted by overload circuit breakers B' and $B^2$ connected between said switches and their respective motors.

The function and operation of the aforedescribed controller together with the circuit connections therefor will now be more fully described. With push buttons 7 in their raised positions, depression of the push button 6 of any of the control stations establishes an energizing circuit for the associated starting switch extending from line L' by conductors 12 and 13 through push button 6 by conductor 14 through push button contact 8 by conductor 15 through circuit breakers B' and $B^2$ by conductor 16 to and through the operating winding of the associated starting switch and by conductor 17 to line 12. Each of the switches $S^2$, $S^3$ and $S^4$ in responding is adapted to maintain itself by a circuit extending from line L' through its left hand pole through auxiliary switch 2 by conductor 18 through push button contacts 8 and thence through its operating winding to line $L^2$ as already traced.

Auxiliary switches 3 are connected in series in the energizing circuit of the feed motor starting switch S', and assuming that all of the switches $S^2$, $S^3$ and $S^4$ are closed, depression of push button 4 establishes an energizing circuit for switch S' extending from line L' by conductors 12 and 19 through the auxiliary switch 3 of starting switch $S^4$ by conductors 20, 21 and 22 through auxiliary switch 3 of starting switch S³ by conductors 23, 24 and 25 through auxiliary switch 3 of starting switch S² by conductors 26 and 27 through push button switches 4 and 5 by conductor 28 through circuit breakers B' and B² by conductor 29 through the operating winding of switch S' and by conductor 30 to line L². In responding switch S' maintains itself through a circuit extending from L' to conductor 27 as already traced by conductor 31 through auxiliary switch 1 by conductor 32 through switch 5 and thence through the winding of said switch to line L² as already traced. Contacts 9 of each of the control stations are connected in shunt with respect to the auxiliary switch 3 of its associated starting switch, and it is thus apparent that if it is desired to start the feed motor with certain of the tool operating motors idle, it is only necessary to lock the push button 7 of the idle motor in its depressed position to establish the aforedescribed energizing circuit between line L' and control station C'. Upon depression of all the push buttons 7 the feed motor M' can be started with tool operating motors idle, and when any of said push buttons are in their depressed position restoration of the same to their normal position immediately interrupts the energizing circuit of the feed motor starting switch whereby it is impossible to start a tool operating motor while the feed motor is in operation. Further it should be noted that under overload conditions in the supply circuit of any of the tool operating motors, circuit breakers B' and B² will respond to interrupt the energizing circuit of the starting switch of such motor and said switch in opening will interrupt the energizing circuit of feed motor switch S' through opening of its auxiliary switch 3. Stopping of any of the tool operating motors can also be effected by depression of its associated push button 7, while stopping of the feed motor can be effected by depression of push button 5.

What I claim as new and desire to secure by Letters Patent is:

1. The combination with a feed motor and a tool operating motor, of a starting controller for each of said motors, the controller for said latter motor having means to be set to render the same ineffective for starting and interlocking means between said controllers insuring against starting of said feed motor except upon starting of said tool operating motor or upon rendering of the controller for said latter motor ineffective for starting.

2. The combination with a feed motor and a plurality of tool operating motors, of a starting controller for each of said motors, the controllers for said tool operating motors being operable selectively and each having means to be set to render the same ineffective for starting, and interlocking means between said controllers insuring against starting of said feed motor except upon starting of all of said tool operating motors or upon rendering of the controller of an idle motor ineffective for starting.

3. The combination with a feed motor and a plurality of tool operating motors of a controller for each of said motors and interlocking means between said controllers insuring against starting of any of said tool operating motors while said feed motor is in operation.

4. The combination with a feed motor and a plurality of tool operating motors of a controller for each of said motors, the controllers for said tool operating motors each having means to be set to render the same ineffective for starting and means between said controllers insuring against starting of any of said tool operating motors while said feed motor is in operation, said means also providing for stopping of said feed motor upon rendering of the controllers of any of said tool operating motors effective for starting.

5. The combination with a feed motor and a plurality of tool operating motors, of an electro-responsive starting switch for each of said motors, a push button control station for each of said switches including two control switches, one operable to effect starting and the other operable to effect stopping, the latter control switches for said tool operating motors being adapted to be set in a position to prevent starting by said former switches and interlocking means between said control stations necessitating starting of said tool operating motors or setting of the latter control switches thereof in the aforesaid positions prior to starting of said feed motor.

6. The combination with a feed motor and a plurality of tool operating motors, of an electro-responsive starting switch for each of said motors, a control station for each of said switches including two control switches one operable to effect starting and the other operable to effect stopping, contacts to be engaged by the latter switches of said tool operating motors upon setting of said switches in the aforesaid positions, an auxiliary switch associated with each of the starting switch for said tool operating motors, and circuit connections controlled by said contacts and said auxiliary switches insuring against starting of any of said tool operating motors while said feed motor is in operation.

7. The combination with a feed motor and a plurality of tool operating motors, starting means for each of said motors including an electro-responsive starting switch and a control station therefor, the control station for each of said tool operating motors including a control switch for starting and another control switch for stopping, the latter switches being adapted to be set in a position to prevent starting by said former switches an auxiliary switch associated with each of the starting switches for said tool operating motors and circuit connection controlled by said latter control switches and said auxiliary switches necessitating starting of said tool operating motors or setting of the latter control switches therefor in the aforesaid position prior to starting of said feed motor.

8. The combination with a feed motor and a plurality of tool operating motors, of a controller for each of said motors and means insuring against starting of any of said tool operating motors while said feed motor is in operation and insuring stopping of said feed motor upon abnormal current conditions in the supply circuit of any of said tool operating motors.

In witness whereof, I have hereunto subscribed my name.

LEONARD P. COULTER.